US012671771B2

(12) United States Patent
Watanabe et al.

(10) Patent No.: US 12,671,771 B2
(45) Date of Patent: Jun. 30, 2026

(54) USER INTERFACE PROCESSING METHOD AND IMAGE PROCESSING APPARATUS

(71) Applicant: KYOCERA Document Solutions Inc., Osaka (JP)

(72) Inventors: Toshihiko Watanabe, Osaka (JP); Toshiya Miyai, Osaka (JP); Suguru Ishikawa, Osaka (JP); Hiroshi Nakagawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 260 days.

(21) Appl. No.: 18/733,774

(22) Filed: Jun. 4, 2024

(65) Prior Publication Data

US 2024/0414274 A1 Dec. 12, 2024

(30) Foreign Application Priority Data

Jun. 7, 2023 (JP) ................................ 2023-093918

(51) Int. Cl.
*H04N 1/00* (2006.01)

(52) U.S. Cl.
CPC ..... *H04N 1/00514* (2013.01); *H04N 1/00411* (2013.01); *H04N 1/00482* (2013.01); *H04N 2201/0094* (2013.01); *H04N 2201/3276* (2013.01)

(58) Field of Classification Search
None
See application file for complete search history.

(56) References Cited

U.S. PATENT DOCUMENTS

2007/0247642 A1* 10/2007 Nakamura ......... H04N 1/00466 358/1.1
2013/0073750 A1* 3/2013 Nakane .............. H04N 1/00456 710/19
2022/0294920 A1* 9/2022 Takahara ........... H04N 1/00517

FOREIGN PATENT DOCUMENTS

JP 2010224767 A 10/2010

* cited by examiner

*Primary Examiner* — Dov Popovici
(74) *Attorney, Agent, or Firm* — Alleman Hall LLP

(57) ABSTRACT

A processor records operation history information indicating a history of operations to an operation portion that corresponds to a plurality of setting screens for each user regarding each of a plurality of functions of an image processing apparatus, in a nonvolatile storage device. The processor determines a learning level for each of the plurality of functions for each of the users based on the operation history information. The processor causes a display portion to display a screen that is selected from a plurality of guidance screens according to an operation to the operation portion, the plurality of guidance screens presenting explanatory information on each of the plurality of functions. The processor incorporates information on the learning level for each of the plurality of functions that corresponds to the user into at least one of the plurality of guidance screens.

9 Claims, 5 Drawing Sheets

USER INTERFACE PROCESSING METHOD AND IMAGE PROCESSING APPARATUS

INCORPORATION BY REFERENCE

This application is based upon and claims the benefit of priority from the corresponding Japanese Patent Application No. 2023-093918 filed on Jun. 7, 2023, the entire contents of which are incorporated herein by reference.

BACKGROUND

The present disclosure relates to a user interface processing method by which an operation learning level of each user can be presented, and an image processing apparatus.

An image processing apparatus such as a printer, a copying machine, and a multifunction peripheral includes a user interface device including an operation device and a display device.

The image processing apparatus includes a guidance function for causing the display device to display a screen that is selected from a plurality of guidance screens according to an operation to the operation device. Each of the guidance screens is a screen that presents explanatory information on each of a plurality of functions of the image processing apparatus.

Further, it is known that in the multifunction peripheral, the user interface device changes priority of display of a plurality of guidance items according to an operation history of each user.

SUMMARY

A user interface processing method according to an aspect of the present disclosure is a method for executing processing related to a user interface in an image processing apparatus including an operation device which accepts an operation and a display device which displays information. The user interface processing method includes executing, by a processor, setting screen control for causing the display device to display a screen that is selected from a plurality of setting screens according to an operation to the operation device toward a user authenticated by user authentication processing, the plurality of setting screens including information related to an operation for setting processing to be executed by the image processing apparatus regarding each of a plurality of functions of the image processing apparatus. The user interface processing method further includes recording, by the processor, operation history information indicating a history of operations to the operation device that corresponds to the plurality of setting screens for each of the users regarding each of the plurality of functions, in a nonvolatile storage device. The user interface processing method further includes determining, by the processor, a learning level for each of the plurality of functions for each of the users based on the operation history information. The user interface processing method further includes executing, by the processor, guidance screen control for causing the display device to display a screen that is selected from a plurality of guidance screens according to an operation to the operation device toward the user authenticated by the user authentication processing, the plurality of guidance screens presenting explanatory information on each of the plurality of functions. In the user interface processing method, the processor incorporates information on the learning level for each of the plurality of functions that corresponds to the user authenticated by the user authentication processing into at least one of the plurality of guidance screens.

An image processing apparatus according to another aspect of the present disclosure includes the operation device, the display device, the processor which realizes the user interface processing method, and an image processing portion. The image processing portion executes image processing set by the operation to the operation device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

[Configuration of Image Processing Apparatus 10]

An image processing apparatus 10 according to the embodiment is capable of executing various types of image processing such as image forming processing, image reading processing, and image transmission processing. For example, the image processing apparatus 10 is a printer, a copying machine, a facsimile apparatus, a multifunction peripheral, or the like.

Figure 1:
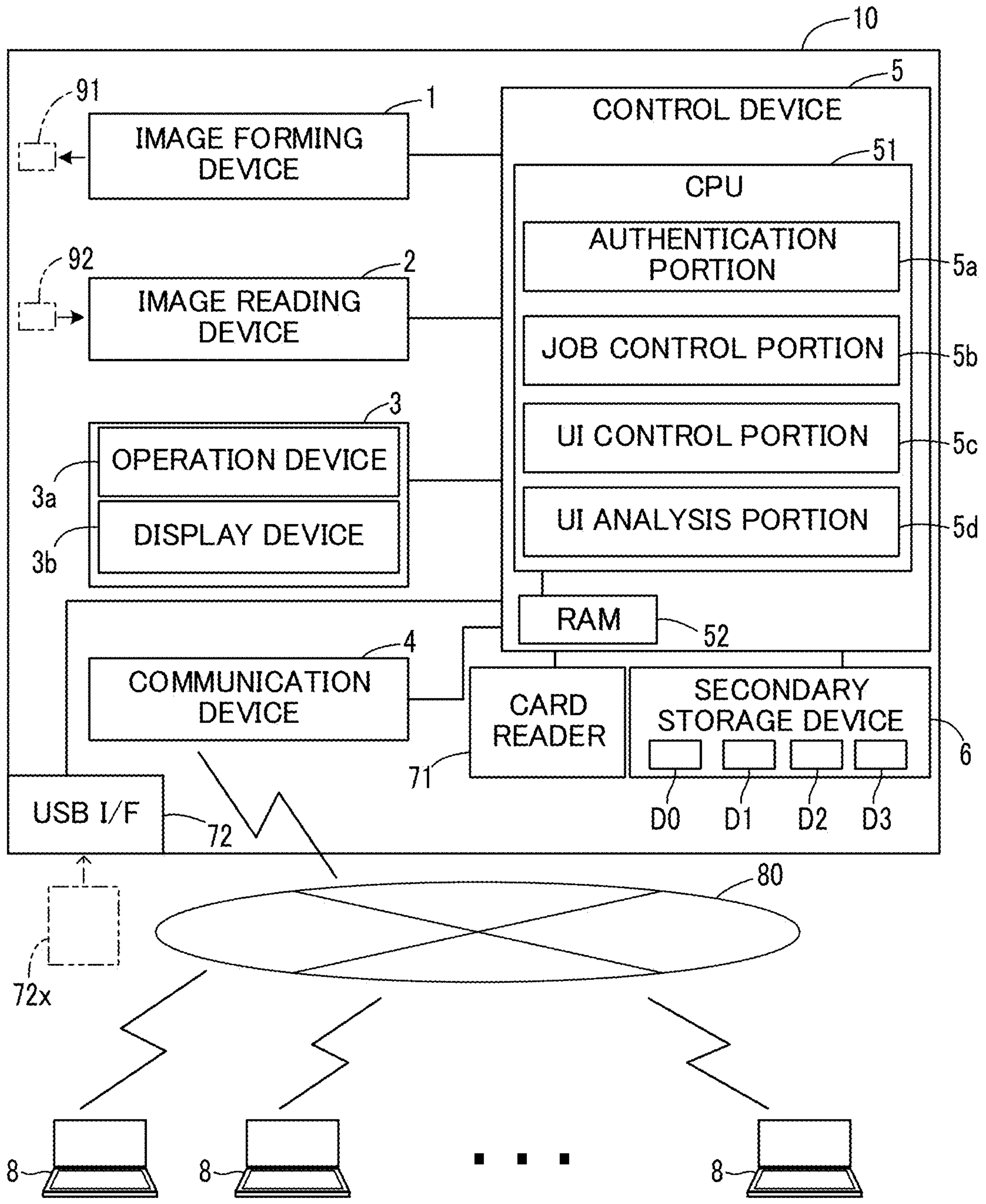
FIG. 1 is a block diagram showing a configuration of an image processing apparatus according to an embodiment.

In the example shown in FIG. 1, the image processing apparatus 10 includes an image forming device 1, an image reading device 2, a touch panel unit 3, a communication device 4, a control device 5, and a secondary storage device 6.

The image processing apparatus 10 is communicable with other apparatuses such as a host apparatus 8 via a network 80. The network 80 includes a LAN (Local Area Network), the Internet, and the like.

The image forming device 1 executes the image forming processing using a predetermined system such as electrophotography and an inkjet system. The image forming processing is processing of forming an image on a sheet 91.

The image forming device 1 includes a sheet conveying mechanism which conveys the sheet 91 and a print device which forms an image on the sheet 91.

The image reading device 2 executes the image reading processing. The image reading processing is processing of reading an image from a document sheet 92. The image reading device 2 includes a laser scanning mechanism which scans light on the document sheet 92 and an image sensor which receives reflected light that has been reflected by the document sheet 92.

The image sensor outputs data of a read image. The read image is an image read from the document sheet 92.

The touch panel unit 3 includes an operation portion 3_a_ and a display portion 3_b_. The operation portion 3_a_ is a device which accepts operations from people. For example, the operation portion 3_a_ includes operation buttons, a touch panel, and the like. The display portion 3_b_ is capable of displaying information. For example, the display portion 3_b_ includes a display panel such as a liquid crystal panel.

The communication device 4 is a communication interface device which performs communication with other apparatuses such as the host apparatus 8 via the network 80. The control device 5 performs all of transmission and reception of data to/from the other apparatuses via the communication device 4.

The image forming device 1 executes the image forming processing that is based on the read image data or reception print data. The reception print data is data included in a print request received from the host apparatus 8 via the communication device 4.

Further, the communication device 4 is capable of executing the image transmission processing. The image transmission processing is processing of transmitting the read image data to a designated destination via the network 80.

A card reader 71 reads authentication data from an ID card of a user. For example, the ID card is a non-contact IC card that stores the authentication data. The non-contact IC card is a card into which an RFID (Radio Frequency Identification) tag is embedded, for example.

A USB interface 72 is an interface to which a USB device 72_x_ such as a USB memory can be connected. Processing of recording image data obtained by the image reading device 2 to the USB memory is also an example of the image processing executable by the image processing apparatus 10. In addition, the image forming processing that is based on image data stored in the USB memory is also an example of the image processing.

The control device 5 executes various calculations, data processing, and control of various electric devices provided in the image processing apparatus 10. The control device 5 includes a CPU 51, a RAM (Random Access Memory) 52, and the like.

The secondary storage device 6 is a nonvolatile computer-readable storage device. The secondary storage device 6 is capable of storing computer programs and various types of data. For example, one or both of an SSD (Solid State Drive) and a hard disk drive is/are adopted as the secondary storage device 6.

The secondary storage device 6 stores the computer programs to be executed by the CPU 51 and data to be referenced by the CPU 51. The CPU 51 is an example of a processor.

The CPU 51 is a processor which executes the computer programs stored in the secondary storage device 6 to execute various types of data processing and control.

It is noted that other processors such as a DSP may execute the data processing and control in place of the CPU 51.

The RAM 52 is a volatile computer-readable storage device. The RAM 52 temporarily stores the computer programs to be executed by the CPU 51 and data to be output and referenced by the CPU 51 during a process of executing the computer programs.

The CPU 51 includes a plurality of processing modules that are realized by executing the computer programs. The plurality of processing modules in the CPU 51 include an authentication portion 5_a_, a job control portion 5_b_, a UI control portion 5_c_, and the like.

The authentication portion 5_a_ executes user authentication processing. The authentication portion 5_a_ collates input authentication data and registration user data DO stored in the secondary storage device 6 in the user authentication processing (see FIG. 1). The input authentication data is authentication data input via the card reader 71 or the communication device 4. The registration user data DO includes authentication data of a user.

The authentication portion 5_a_ permits a user authenticated by the user authentication processing to execute image processing corresponding to a request input via the operation portion 3_a_ or the communication device 4.

The job control portion 5_b_ executes job control under a condition that the user authentication processing has succeeded. The job control is processing of causing various devices of the image processing apparatus 10 to execute the image processing corresponding to the request input via the operation portion 3_a_ or the communication device 4.

The job control portion 5_b_ controls the image forming device 1, the image reading device 2, and the communication device 4. The job control portion 5_b_ causes some or all of the image forming device 1, the image reading device 2, and the communication device 4 to execute the requested image processing.

The image forming device 1, the image reading device 2, and the communication device 4 are an example of an image processing portion capable of executing the image processing set by an operation to the operation portion 3_a_. In the present embodiment, the image processing includes the image forming processing, the image reading processing, and the image transmission processing.

The UI control portion 5_c_ executes screen control toward the user authenticated by the user authentication processing. In the screen control, the UI control portion 5_c_ selects a target screen from a plurality of candidate screens according to an operation to the operation portion 3_a_ so as to cause the display portion 3_b_ to display the selected target screen.

The plurality of candidate screens include a plurality of setting screens. The plurality of setting screens include information related to an operation for setting the processing to be executed by the image processing apparatus 10 regarding each of a plurality of functions of the image processing apparatus 10.

For example, each of the setting screens includes one or more operation icons corresponding to an operation for setting a type, condition, or start of the processing to be executed by the image processing apparatus 10 regarding various functions such as an image forming function, a copying function, an image transmission function, and a facsimile transmission function.

The plurality of candidate screens further include a plurality of guidance screens. The plurality of guidance screens are screens that present explanatory information on the plurality of functions of the image processing apparatus 10. The UI control portion 5*c* realizes a guidance function for causing the display portion 3*b* to display a screen that is selected from the plurality of guidance screens according to an operation to the operation portion 3*a*.

Incidentally, in the image processing apparatus 10, it is desirable for each of the users to be capable of easily grasping a learning level of the user him/herself regarding the operations related to the plurality of functions. Thus, each of the users can efficiently learn an operation method of the image processing apparatus 10 using the guidance function.

In the present embodiment, the plurality of processing modules in the CPU 51 further include a UI analysis portion 5*d* (see FIG. 1). As will be described later, the UI analysis portion 5*d* determines a learning level of each of the users regarding the operations related to the plurality of functions of the image processing apparatus 10.

In addition, in the guidance function, the UI control portion 5*c* can present information on the learning level to each of the users. Hereinafter, user interface processing carried out by the UI analysis portion 5*d* and the UI control portion 5*c* will be described.

In the present embodiment, the user interface processing includes screen output processing and learning level determination processing. The screen output processing is processing of controlling a screen output in the display portion 3*b*. The learning level determination processing is processing of determining the learning level of each of the users regarding the operations in the image processing apparatus 10.

The user interface processing is an example of processing for realizing a user interface processing method. The CPU 51 which executes the user interface processing is an example of a processor which realizes the user interface processing method. The user interface processing method is a method of executing processing related to a user interface.

[Screen Output Processing]

Figure 2:
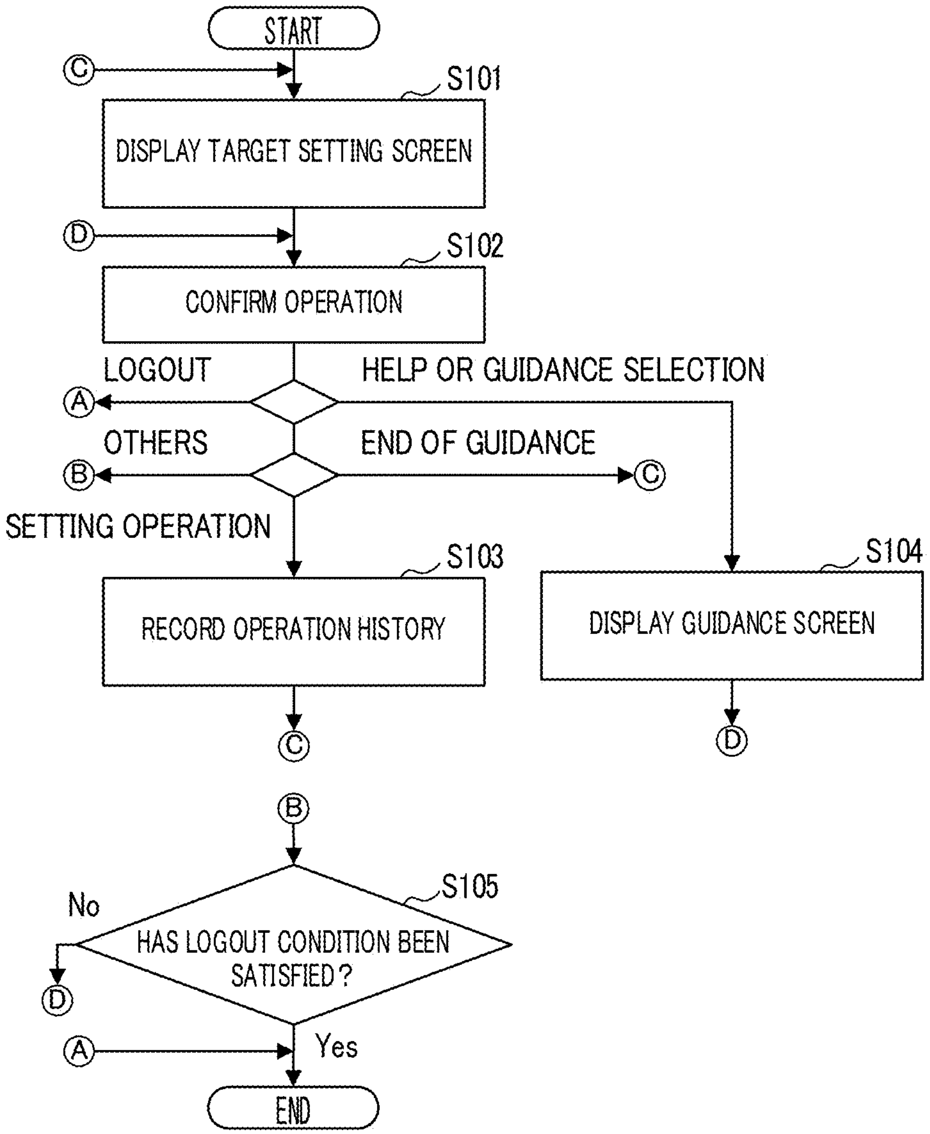
FIG. 2 is a flowchart showing exemplary procedures of screen output processing in the image processing apparatus according to the embodiment.

Hereinafter, exemplary procedures of the screen output processing will be described with reference to the flowchart shown in FIG. 2.

When the user authentication processing by the authentication portion 5*a* has succeeded, the UI control portion 5*c* executes the screen output processing. In other words, the UI control portion 5*c* executes the screen output processing toward the user authenticated by the user authentication processing.

In descriptions below, S101, S102, . . . represent identification codes of a plurality of steps in the screen output processing. In the screen output processing, processing of Step S101 is executed first.

<Step S101>

In Step S101, the UI control portion 5*c* selects a target setting screen from the plurality of setting screens and causes the display portion 3*b* to display the selected target setting screen.

Figure 4:
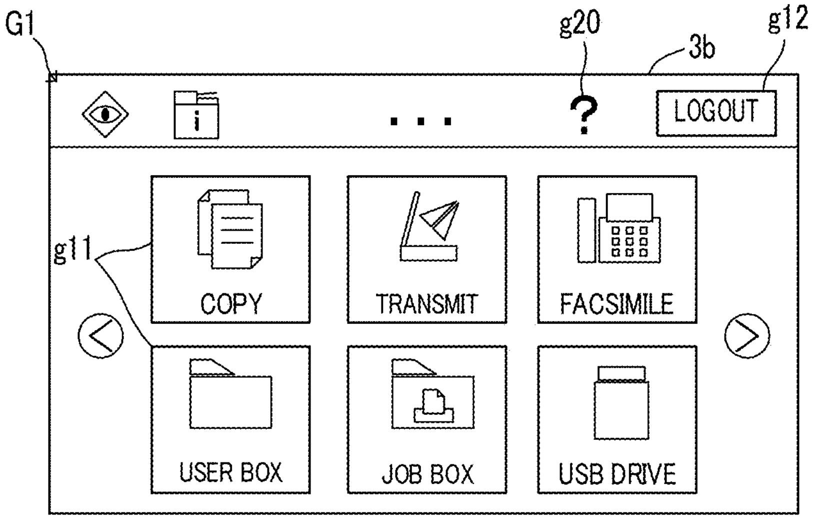
FIG. 4 is a diagram showing an example of a setting screen in the image processing apparatus according to the embodiment.

FIG. 4 is an example of a main menu screen G1 that is one of the plurality of setting screens. The main menu screen G1 is a screen that is selected first from the plurality of setting screens after ending the user authentication processing.

The main menu screen G1 includes a plurality of setting operation icons g11, a logout icon g12, and a help icon g20.

The plurality of setting operation icons g11 are each an operation icon for setting the type, condition, or start of the processing to be executed by the image processing apparatus 10. The plurality of setting operation icons g11 in the main menu screen G1 each correspond to an operation for setting the type of the image processing to be executed by the image processing apparatus 10.

It is noted that some of the plurality of setting screens include a manual input icon (not shown) that is an example of the plurality of setting operation icons g11. The manual input icon is an icon corresponding to an operation for inputting numerical values or characters for designating a condition of the processing to be executed by the image processing apparatus 10.

In the present embodiment, setting the type of the image processing to be executed by the image processing apparatus 10 means selecting one of the plurality of functions of the image processing apparatus 10.

The logout icon g12 is an operation icon which accepts an operation for eliminating a login state that is a state where the user is authenticated.

It is noted that the logout icon g12 may be included in some or all of the plurality of setting screens excluding the main menu screen G1. In addition, the logout icon g12 may be included in some or all of the plurality of guidance screens.

The plurality of guidance screens include a guidance selection screen G2 and a plurality of individual guidance screens (not shown). The help icon g20 is an operation icon that accepts an operation for requesting the display portion 3*b* to display the guidance selection screen G2 (see FIG. 5).

The guidance selection screen G2 includes a plurality of guidance selection icons g21 and a guidance end icon g22.

The plurality of guidance selection icons g21 correspond to the plurality of individual guidance screens. The plurality of individual guidance screens are screens including information that explains operation methods respectively corresponding to the plurality of setting screens.

The plurality of guidance selection icons g21 are each an operation icon that accepts an operation for selecting a target guidance screen to be displayed by the display portion 3*b* out of the plurality of individual guidance screens.

The guidance end icon g22 is an operation icon that accepts an operation for instructing an end of the processing for causing any of the plurality of guidance screens to be displayed by the display portion 3*b*.

After executing the processing of Step S101, the UI control portion 5*c* executes processing of Step S102.

<Step S102>

In Step S102, the UI control portion 5*c* confirms a status of the operation to the operation portion 3*a*. In addition, the UI control portion 5*c* selects processing to be executed next according to the status of the operation to the operation portion 3*a*.

Under a situation where one of the plurality of setting screens is displayed by the display portion 3*b*, the UI control portion 5*c* executes processing of Step S103 when a setting operation corresponding to any of the plurality of setting operation icons g11 in the target setting screen is made to the operation portion 3*a*.

Further, under a situation where the main menu screen G1 is displayed by the display portion 3*b*, the UI control portion 5*c* executes processing of Step S104 when an operation corresponding to the help icon g20 is made to the operation portion 3*a*.

In addition, under a situation where the guidance selection screen G2 is displayed by the display portion 3*b*, the UI control portion 5*c* executes the processing of Step S104 also when a guidance selection operation corresponding to any of the plurality of guidance selection icons g21 is made to the operation portion 3*a*.

In addition, under a situation where one of the plurality of guidance screens is displayed by the display portion 3*b*, the UI control portion 5*c* executes the processing of Step S101 when an operation corresponding to the guidance end icon g22 is made to the operation portion 3*a*.

For example, when the operation corresponding to the guidance end icon g22 is made to the operation portion 3*a*, the UI control portion 5*c* causes the display portion 3*b* to display the main menu screen G1 in Step S101.

Moreover, when an operation corresponding to the logout icon g12 is made to the operation portion 3*a*, the UI control portion 5*c* ends the screen output processing.

Further, when an operation corresponding to the screen displayed by the display portion 3*b* is not made to the operation portion 3*a*, the UI control portion 5*c* executes processing of Step S105.

<Step S103>

Figure 6:
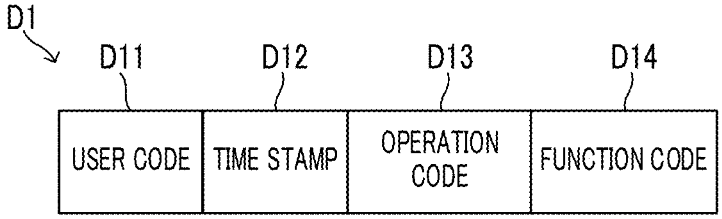
FIG. 6 is a diagram showing an example of a configuration of operation history data in the image processing apparatus according to the embodiment.

In Step S103, the UI control portion 5*c* records operation history data D1 indicating a history of the setting operation confirmed in Step S102 in the secondary storage device 6 (see FIG. 1 and FIG. 6).

The setting operation confirmed in Step S102 is one of a plurality of unit operations corresponding to the plurality of setting screens.

For example, the UI control portion 5*c* incorporates a user code D11, a time stamp D12, an operation code D13, and a function code D14 into the operation history data D1 (see FIG. 6).

The user code D11 is data for identifying the user authenticated by the user authentication processing. In other words, the user code D11 is an identifier of the logged-in user. For example, a user ID used for the user authentication processing or the like is recorded as the user code D11.

The time stamp D12 is data indicating a date and time on/at which the setting operation has been made to the operation portion 3*a*. In the present embodiment, the time stamp D12 includes data on a date and data on a time.

The operation code D13 is data for identifying the setting operation confirmed in Step S102. The operation code D13 indicates which of the plurality of setting operation icons g11 in the plurality of setting screens has been operated by the user.

The function code D14 is data for identifying a target function corresponding to the setting operation confirmed in Step S102 out of the plurality of image processing functions of the image processing apparatus 10.

For example, the function code D14 is a code for identifying the image forming function, the copying function, the image transmission function, the facsimile transmission function, or the like.

In the present embodiment, each of the image forming function, the copying function, the image transmission function, and the facsimile transmission function is categorized into a more detailed function according to a difference in an input source of image data.

Each of the plurality of setting operation icons g11 in the plurality of setting screens is associated with the operation code D13 and the function code D14 in advance.

After executing the processing of Step S103, the UI control portion 5*c* executes the processing of Step S101. In Step S101 after Step S103, the UI control portion 5*c* causes the display portion 3*b* to display a new target setting screen corresponding to the setting operation confirmed in Step S102.

The processing of Step S101 and Step S102 is an example of setting screen control for causing the display portion 3*b* to display a screen that is selected from the plurality of setting screens according to an operation to the operation portion 3*a*.

Then, under a situation where the new target setting screen is displayed by the display portion 3*b*, the processing of Step S102 is executed again.

The processing of Step S103 is executed every time the setting operation is made to the operation portion 3*a*. Thus, the operation history data D1 indicating a history of the operation to the operation portion 3*a*, that corresponds to the plurality of setting screens, is recorded in the secondary storage device 6.

By incorporating the user code D11 and the function code D14 therein, the operation history data D1 indicates a history of operations for each of the users regarding each of the plurality of functions of the image processing apparatus 10.

<Step S104>

In Step S104, the UI control portion 5*c* selects the target guidance screen corresponding to the operation confirmed in Step S102 out of the plurality of guidance screens, and causes the display portion 3*b* to display the selected target guidance screen.

When the operation confirmed in Step S102 is a help operation, the UI control portion 5*c* causes the display portion 3*b* to display the guidance selection screen G2. The help operation is an operation corresponding to the help icon g20 in the main menu screen G1 (see FIG. 5).

Meanwhile, when the operation confirmed in Step S102 is the guidance selection operation, the UI control portion 5*c* causes the display portion 3*b* to display one of the plurality of guidance screens that corresponds to the guidance selection operation. The guidance selection operation is an operation corresponding to any of the plurality of guidance selection icons g21 in the guidance selection screen G2 (see FIG. 5).

The processing of Step S102 and Step S104 is an example of guidance screen control for causing the display portion 3*b* to display a screen that is selected from the plurality of guidance screens according to an operation to the operation portion 3*a*.

Figure 5:
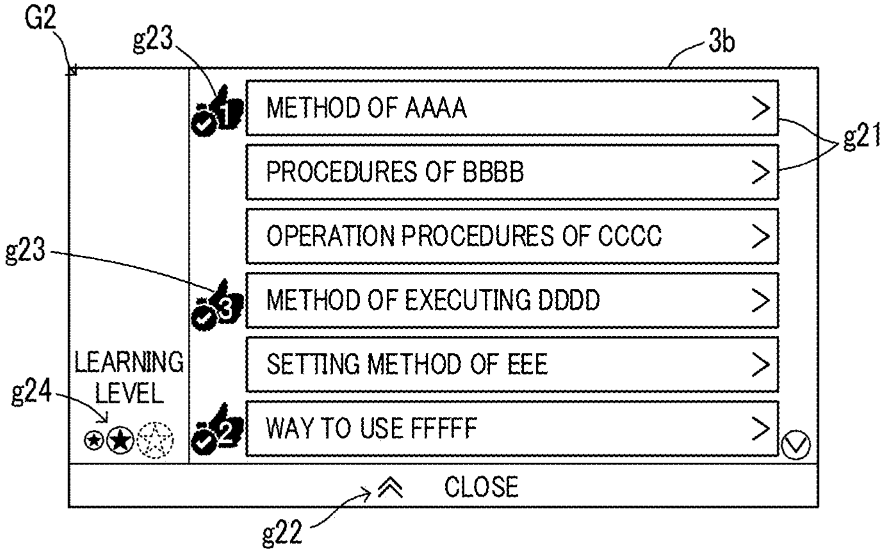
FIG. 5 is a diagram showing an example of a guidance screen in the image processing apparatus according to the embodiment.

As shown in FIG. 5, the UI control portion 5*c* may incorporate one or a plurality of individual learning level marks g23 into the guidance selection screen G2. Similarly, the UI control portion 5*c* may also incorporate an overall learning level mark g24 into the guidance selection screen G2.

The individual learning level mark g23 and the overall learning level mark g24 will be described later.

<Step S105>

In Step S105, the UI control portion 5*c* determines whether or not a predetermined logout condition is satisfied.

For example, the logout condition is a condition that a duration of a state where no operation is made to the operation portion 3*a* has exceeded a preset first setting time.

When the image processing apparatus 10 includes a human detecting sensor, the logout condition may be a condition that a duration of a state where no one is detected by the human detecting sensor has exceeded a preset second setting time.

The human detecting sensor detects a person present in front of the image processing apparatus 10. For example, an infrared sensor is adopted as the human detecting sensor.

When determining that the logout condition has not been satisfied, the UI control portion 5c repeats the processing from Step S102.

On the other hand, when determining that the logout condition has been satisfied, the UI control portion 5c ends the screen output processing.

Step S103 is an example of a step in which the CPU 51 records, in a nonvolatile storage device, the operation history information of each of the users authenticated by the user authentication processing regarding each of the plurality of functions of the image processing apparatus 10.

The operation history information indicates a history of operations to the operation portion 3a that corresponds to the plurality of setting screens. The operation history data D1 is an example of the operation history information.

Step S103 is also an example of a step in which the CPU 51 incorporates information on the operation date and time into the operation history information. The time stamp D12 is an example of the information on the operation date and time.

[Learning Level Determination Processing]

Figure 3:
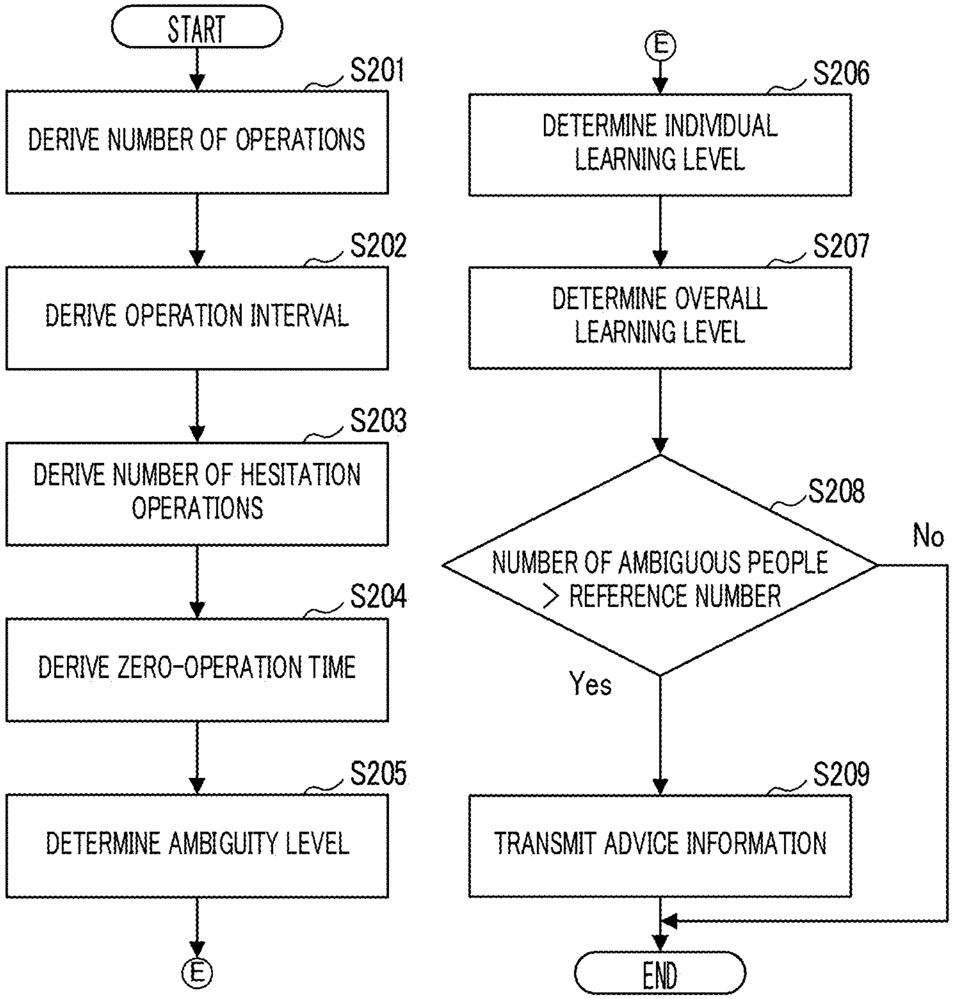
FIG. 3 is a flowchart showing exemplary procedures of learning level determination processing in the image processing apparatus according to the embodiment.

Next, exemplary procedures of the learning level determination processing will be described with reference to the flowchart shown in FIG. 3.

For example, the UI analysis portion 5d executes the learning level determination processing every time the operation history data D1 is updated. Alternatively, the UI analysis portion 5d may execute the learning level determination processing every time the image processing apparatus 10 executes the image processing corresponding to the operation to the operation portion 3a.

In descriptions below, S201, S202, . . . represent identification codes of a plurality of steps in the learning level determination processing. In the learning level determination processing, processing of Step S201 is executed first.

Index values that are derived or determined in the learning level determination processing are all index values obtained for each of the users.

<Step S201>

In Step S201, the UI analysis portion 5d derives the number of operations for each of the plurality of functions based on the operation history data D1. The UI analysis portion 5d further executes processing of Step S202.

<Step S202>

In Step S202, the UI analysis portion 5d derives an operation interval for each of the plurality of functions based on the operation history data D1.

The operation interval is an interval of a plurality of the operation dates and times corresponding to a series of a plurality of operations for setting one processing to be executed by the image processing apparatus 10. The operation date and time is specified by the time stamp D12.

The series of a plurality of operations is specified by the user code D11, the time stamp D12, the operation code D13, and the function code D14. The UI analysis portion 5d extracts serial operation data corresponding to the series of a plurality of operations from the operation history data D1.

For example, serial operation master data corresponding to each of the plurality of functions is registered in advance. The serial operation master data indicates a start operation and an end operation out of the series of a plurality of operations.

The UI analysis portion 5d extracts, from the operation history data D1, functional continuous data having a common user code D11 and function code D14 and continuous time stamps D12.

In addition, the UI analysis portion 5d extracts, as the serial operation data, data corresponding to the operation code D13 representing the start operation to data corresponding to the operation code D13 representing the end operation from the functional continuous data arranged in the order of the time stamps D12.

For example, the UI analysis portion 5d derives one or both of an average value and maximum value of the time intervals of the time stamps D12 in the serial operation data as the operation interval. The UI analysis portion 5d further executes processing of Step S203.

<Step S203>

In Step S203, the UI analysis portion 5d derives the number of hesitation operations for each of the plurality of functions based on the operation history data D1.

At least some of the plurality of setting screens include one or both of a cancel icon and a return icon. The cancel icon is an operation icon that accepts an operation for instructing cancel of the setting of the processing to be executed by the image processing apparatus 10. The return icon is an operation icon that accepts an operation for instructing return of the setting of the processing to be executed by the image processing apparatus 10.

In descriptions below, an operation to one or both of the cancel icon and the return icon will be referred to as a hesitation operation. In other words, the operations corresponding to the plurality of setting screens include the hesitation operation.

The number of hesitation operations is the number of times the hesitation operation is made when the series of setting operations corresponding to each of the plurality of setting screens is made. The UI analysis portion 5d derives the number of hesitation operations by counting the number of operation codes D13 each representing the hesitation operation included in the serial operation data extracted from the operation history data D1.

The UI analysis portion 5d further executes processing of Step S204.

<Step S204>

In Step S204, the UI analysis portion 5d derives a zero-operation time for each of the plurality of functions based on the operation history data D1. The zero-operation time is a time during which an operation to the operation portion 3a is not made.

The UI analysis portion 5d derives the zero-operation time based on the time stamp D12 of the operation history data D1 for each of the plurality of functions. For example, the UI analysis portion 5d derives the number of days the operation to the operation portion 3a is not made as the zero-operation time.

The UI analysis portion 5d further executes processing of Step S205.

<Step S205>

In Step S205, the UI analysis portion 5d determines an ambiguity level for each of the plurality of functions according to one or both of the operation interval derived in Step S202 and the number of hesitation operations derived in Step S203.

The ambiguity level is an evaluation value for ambiguity in understanding of the user with respect to the operations for the plurality of functions. For example, the UI analysis portion 5d determines the ambiguity level in a plurality of levels of about two to five levels.

Specifically, the UI analysis portion 5d determines a first ambiguity level by comparing the operation interval and one or more preset referencing times. In this case, the UI analysis portion 5d determines that the first ambiguity level of a case where the operation interval is long is higher than that of a case where the operation interval is short.

Further, when the operation interval includes the average value and maximum value of the time intervals of the time stamps D12 in the serial operation data, the UI analysis portion 5*d* may determine the first ambiguity level according to a difference between the maximum value and the average value. The difference between the maximum value and the average value is an example of an index value for the variation in the time intervals of the time stamps D12. In this case, the UI analysis portion 5*d* determines that the first ambiguity level of a case where the difference is large is higher than that of a case where the difference is small.

In addition, the UI analysis portion 5*d* determines a second ambiguity level by comparing the number of hesitation operations and one or more preset numbers of times of reference. In this case, the UI analysis portion 5*d* determines that the second ambiguity level of a case where the number of hesitation operations is large is higher than that of a case where the number of hesitation operations is small.

Furthermore, the UI analysis portion 5*d* selects the higher one of the first ambiguity level and the second ambiguity level as the ambiguity level. It is noted that the first ambiguity level may be the ambiguity level. Similarly, the second ambiguity level may alternatively be the ambiguity level.

In the present embodiment, the UI analysis portion 5*d* determines the ambiguity level only when the number of times the series of a plurality of operations for each of the plurality of functions is made, for each of the users, exceeds a preset number of times as an effective lower limit. An initial value of the ambiguity level is indefinite.

It is noted that the number of the serial operation data for each of the plurality of functions for each of the users that is included in the operation history data D1 is the number of times the series of a plurality of operations for each of the plurality of functions is made, for each of the users.

The UI analysis portion 5*d* further executes processing of Step S206.

<Step S206>

In Step S206, the UI analysis portion 5*d* determines an individual learning level for each of the plurality of functions based on the result obtained by the processing of Step S201 to Step S205.

For example, the UI analysis portion 5*d* determines the individual learning level in a plurality of levels of about three to five levels. In the present embodiment, the UI analysis portion 5*d* determines the individual learning level in three levels.

In the present embodiment, the UI analysis portion 5*d* determines the individual learning level for each of the plurality of functions according to the number of operations for each of the plurality of functions.

Specifically, the UI analysis portion 5*d* determines the individual learning level by comparing the number of operations and one or more preset reference number of times. In this case, the UI analysis portion 5*d* determines that the individual learning level of a case where the number of hesitation operations is large is higher than that of a case where the number of hesitation operations is small.

In addition, the UI analysis portion 5*d* corrects the individual learning level for each of the plurality of functions according to the operation interval for each of the plurality of functions. For example, the UI analysis portion 5*d* corrects the individual learning level for each of the plurality of functions according to the first ambiguity level for each of the plurality of functions.

In addition, the UI analysis portion 5*d* corrects the individual learning level for each of the plurality of functions according to the number of hesitation operations for each of the plurality of functions. For example, the UI analysis portion 5*d* corrects the individual learning level for each of the plurality of functions according to the second ambiguity level for each of the plurality of functions.

The UI analysis portion 5*d* corrects the individual learning level to become lower as the first ambiguity level becomes higher. Similarly, the UI analysis portion 5*d* corrects the individual learning level to become lower as the second ambiguity level becomes higher.

In addition, the UI analysis portion 5*d* corrects the individual learning level according to the zero-operation time for each of the plurality of functions that has been derived in Step S204.

The UI analysis portion 5*d* corrects the individual learning level to become lower as the zero-operation time becomes longer.

For example, the UI analysis portion 5*d* sets the individual learning level onto which the correction based on each of the operation interval, the number of hesitation operations, and the zero-operation time is reflected as the individual learning level for each of the plurality of functions.

Alternatively, the UI analysis portion 5*d* may set the individual learning level onto which only the largest correction amount out of the correction amount that is based on the operation interval, the correction amount that is based on the number of hesitation operations, and the correction amount that is based on the zero-operation time is reflected as the individual learning level for each of the plurality of functions.

Figure 7:
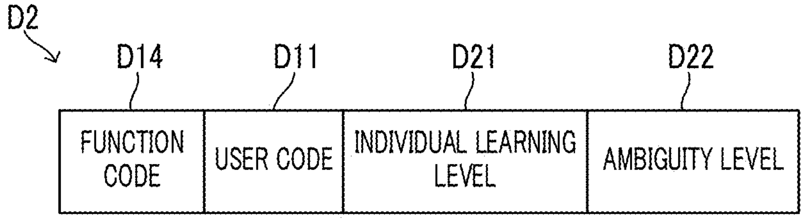
FIG. 7 is a diagram showing an example of a configuration of individual learning level data in the image processing apparatus according to the embodiment.

In Step S206, the UI analysis portion 5*d* records the determination results obtained in Step S205 and Step S206 in the secondary storage device 6 as individual learning level data D2 (see FIG. 1 and FIG. 7).

As shown in FIG. 7, the UI analysis portion 5*d* records the individual learning level data D2 including the function code D14, the user code D11, an individual learning level D21, and an ambiguity level D22 associated with one another in the secondary storage device 6.

The ambiguity level D22 is the result obtained in Step S205, and the individual learning level D21 is the result obtained in Step S206. As described heretofore, the UI analysis portion 5*d* determines the individual learning level D21 for each of the plurality of functions for each of the users based on the operation history data D1 (see Step S201 to Step S206). The UI analysis portion 5*d* further executes processing of Step S207.

<Step S207>

In Step S207, the UI analysis portion 5*d* integrates the individual learning level for each of the plurality of functions to thus determine an overall learning level of each of the users.

For example, the UI analysis portion 5*d* sets a minimum value, average value, central value, or maximum value of the individual learning levels for the plurality of functions as the overall learning level.

Figure 8:
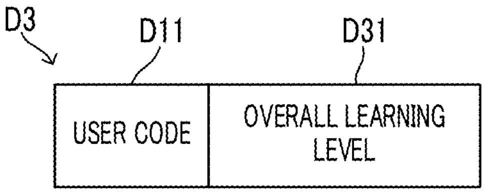
FIG. 8 is a diagram showing an example of a configuration of overall learning level data in the image processing apparatus according to the embodiment.

In Step S207, the UI analysis portion 5*d* records the determination result obtained in Step S207 in the secondary storage device 6 as overall learning level data D3 (see FIG. 1 and FIG. 8).

As shown in FIG. 8, the UI analysis portion 5*d* records the overall learning level data D3 including the user code D11 and an overall learning level D31 associated with each other in the secondary storage device 6.

The overall learning level D31 is the result obtained in Step S207. The UI analysis portion 5*d* further executes processing of Step S208.

<Step S208>

In Step S208, the UI analysis portion 5*d* counts, for each of the plurality of functions, the number of ambiguous people that is the number of users whose ambiguity level determined in Step S205 exceeds a reference level.

In addition, the UI analysis portion 5*d* determines the next processing according to whether or not the number of ambiguous people exceeds a preset reference number. The UI analysis portion 5*d* executes processing of Step S209 when the number of ambiguous people exceeds the reference number.

In descriptions below, the function in which the number of ambiguous people exceeds the reference number out of the plurality of functions of the image processing apparatus 10 will be referred to as a specific function.

On the other hand, the UI analysis portion 5*d* ends the learning level determination processing when the number of ambiguous people does not exceed the reference number.

<Step S209>

In Step S209, the UI analysis portion 5*d* transmits advice information related to the specific function to a destination corresponding to an ambiguous person via the communication device 4. The ambiguous person is a user whose ambiguity level exceeds the reference level.

First, a first example of the processing of Step S209 will be described. In the first example, the UI analysis portion 5*d* extracts, as the advice information, information corresponding to the specific function from the explanatory information included in the plurality of guidance screens.

In the first example, the UI analysis portion 5*d* transmits the advice information extracted from the explanatory information included in the plurality of guidance screens to the destination corresponding to the ambiguous person.

Next, a second example of the processing of Step S209 will be described. In the second example, the UI analysis portion 5*d* specifies a skilled user who is a user whose learning level for the specific function exceeds a predetermined level based on the individual learning level data D2.

In addition, the UI analysis portion 5*d* extracts the serial operation data for the specific function that corresponds to the skilled user from the operation history data D1.

In the second example, the UI analysis portion 5*d* generates information on operation procedures expressed by the extracted serial operation data as the advice information. In this case, the advice information is information on an operation example regarding the specific function.

In the second example, the UI analysis portion 5*d* transmits the advice information generated based on the serial operation data to the destination corresponding to the ambiguous person.

Alternatively, the UI analysis portion 5*d* may transmit the advice information of both of the first example and the second example to the destination corresponding to the ambiguous person.

Meanwhile, after executing the processing of Step S209, the UI analysis portion 5*d* ends the learning level determination processing.

Meanwhile, when causing the display portion 3*b* to display the guidance selection screen G2, the UI control portion 5*c* incorporates the one or plurality of individual learning level marks g23 and the overall learning level mark g24 into the guidance selection screen G2 (see FIG. 5).

The UI control portion 5*c* specifies the individual learning level D21 and the overall learning level D31 that correspond to the user authenticated by the user authentication processing based on the user code D11 included in the individual learning level data D2 and the overall learning level data D3.

Each of the individual learning level marks g23 is a mark representing the individual learning level D21 in the individual learning level data D2. In the example shown in FIG. 5, the numerical values included in the individual learning level marks g23 each represent a level of the individual learning level D21.

The individual learning level mark g23 is an example of information on the learning level for each of the plurality of functions, that corresponds to the user authenticated by the user authentication processing.

Each of the individual learning level marks g23 is arranged at a position corresponding to one of the plurality of guidance selection icons g21 in the guidance selection screen G2. The plurality of guidance selection icons g21 correspond to the plurality of functions of the image processing apparatus 10.

Each of the individual learning level marks g23 is a mark that indicates that an operation for the corresponding function has been performed at least once. Accordingly, the UI control portion 5*c* causes the display portion 3*b* not to display the individual learning level mark g23 corresponding to the function for which the operation has not been made even once out of the plurality of functions.

The UI control portion 5*c* determines a correspondence relationship between the individual learning level mark g23 and the plurality of guidance selection icons g21 based on the function code D14 in the individual learning level data D2.

It is noted that the UI control portion 5*c* may incorporate, into a specific screen other than the guidance selection screen G2 out of the plurality of guidance screens, the individual learning level mark g23 corresponding to the specific screen.

In other words, in Step S101, the UI control portion 5*c* incorporates the information on the learning level for each of the plurality of functions, that corresponds to the user authenticated by the user authentication processing, into at least one of the plurality of guidance screens (see FIG. 5).

On the other hand, the overall learning level mark g24 is a mark representing the overall learning level D31 in the overall learning level data D3. In the example shown in FIG. 5, the number of colored star marks included in the overall learning level mark g24 expresses the level of the overall learning level D31.

The overall learning level mark g24 is an example of information on the overall learning level that corresponds to the user authenticated by the user authentication processing.

In other words, in Step S101, the UI control portion 5*c* incorporates the information on the overall learning level that corresponds to the user authenticated by the user authentication processing into at least one of the plurality of guidance screens (see FIG. 5).

By executing the screen output processing and the learning level determination processing, the information on the learning level regarding the operation related to each of the plurality of functions of the image processing apparatus 10 is presented to each of the users via the display portion 3*b*.

By adopting the image processing apparatus 10, each of the users can easily grasp his/her own learning level regarding the operation related to each of the plurality of functions. Thus, each of the users can efficiently learn the operation method of the image processing apparatus 10 using the guidance function.

Notes of Disclosure

Hereinafter, a general outline of the disclosure extracted from the embodiment described above will be noted. It is noted that the respective configurations and processing functions described in the notes below can be sorted and arbitrarily combined as appropriate.

<Note 1>

A user interface processing method for executing processing related to a user interface in an image processing apparatus including an operation device which accepts an operation and a display device which displays information, the user interface processing method including:

executing, by a processor, setting screen control for causing the display device to display a screen that is selected from a plurality of setting screens according to an operation to the operation device toward a user authenticated by user authentication processing, the plurality of setting screens including information related to an operation for setting processing to be executed by the image processing apparatus regarding each of a plurality of functions of the image processing apparatus;

recording, by the processor, operation history information indicating a history of operations to the operation device that corresponds to the plurality of setting screens for each of the users regarding each of the plurality of functions, in a nonvolatile storage device;

determining, by the processor, a learning level for each of the plurality of functions for each of the users based on the operation history information; and executing, by the processor, guidance screen control for causing the display device to display a screen that is selected from a plurality of guidance screens according to an operation to the operation device toward the user authenticated by the user authentication processing, the plurality of guidance screens presenting explanatory information on each of the plurality of functions, in which the processor incorporates information on the learning level for each of the plurality of functions that corresponds to the user authenticated by the user authentication processing into at least one of the plurality of guidance screens.

<Note 2>

The user interface processing method according to Note 1, including:

deriving, by the processor, a number of operations for each of the plurality of functions based on the operation history information; and determining, by the processor, the learning level for each of the plurality of functions according to the number of operations for each of the plurality of functions.

<Note 3>

The user interface processing method according to Note 2, including:

incorporating, by the processor, information on an operation date and time indicating a date and time on/at which an operation to the operation device has been made into the operation history information;

deriving, by the processor, for each of the plurality of functions, an operation interval which is an interval of a plurality of the operation dates and times corresponding to a series of a plurality of operations for setting one processing to be executed by the image processing apparatus based on the operation history information; and correcting, by the processor, the learning level for each of the plurality of functions according to the operation interval for each of the plurality of functions.

<Note 4>

The user interface processing method according to Note 3, further including:

determining, by the processor, an ambiguity level for each of the plurality of functions for each of the users according to the operation interval for each of the plurality of functions; and transmitting, by the processor, when the plurality of functions include a specific function in which a number of the users having the ambiguity level exceeding a reference level exceeds a reference number, advice information related to the specific function to a destination corresponding to each of the users having the ambiguity level exceeding the reference level via a communication device.

<Note 5>

The user interface processing method according to Note 2, including:

incorporating, by the processor, information on an operation date and time indicating a date and time on/at which an operation to the operation device has been made into the operation history information;

deriving, by the processor, a zero-operation time for each of the plurality of functions for each of the users based on the information on the operation date and time; and correcting, by the processor, the learning level for each of the plurality of functions according to the zero-operation time for each of the plurality of functions.

<Note 6>

The user interface processing method according to any one of Notes 2 to 5, including:

when operations corresponding to the plurality of setting screens include a hesitation operation that instructs cancel or return of a setting of the processing to be executed by the image processing apparatus, deriving, by the processor, for each of the plurality of functions, a number of hesitation operations that is a number of the hesitation operations that have been made when performing a series of setting operations for setting one processing to be executed by the image processing apparatus, based on the operation history information; and correcting, by the processor, the learning level for each of the plurality of functions according to the number of hesitation operations for each of the plurality of functions.

<Note 7>

The user interface processing method according to Note 6, including:

determining, by the processor, an ambiguity level for each of the plurality of functions for each of the users according to the number of hesitation operations for each of the plurality of functions for each of the users, and transmitting, by the processor, when a number of the users having the ambiguity level exceeding a reference level exceeds a reference number regarding a specific function out of the plurality of functions, advice information related to the specific function to a destination corresponding to each of the users having the ambiguity level exceeding the reference level via a communication device.

<Note 8>

The user interface processing method according to any one of Notes 1 to 7, including:

determining, by the processor, an overall learning level obtained by integrating the learning level for each of the plurality of functions for each of the users; and incorporating, by the processor, information on the overall learning level that corresponds to the user authenticated by the user authentication processing into at least one of the plurality of guidance screens.

<Note 9>

An image processing apparatus, including:

an operation device which accepts an operation;

a display device which displays information;

a processor which realizes the user interface processing method according to any one of Notes 1 to 8; and an image processing portion which executes image processing set by the operation to the operation device.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A user interface processing method for executing processing related to a user interface in an image processing apparatus including an operation device which accepts an operation and a display device which displays information, the user interface processing method comprising:

executing, by a processor, setting screen control for causing the display device to display a screen that is selected from a plurality of setting screens according to an operation to the operation device toward a user authenticated by user authentication processing, the user being one of a plurality of users, the plurality of setting screens including information related to an operation for setting processing to be executed by the image processing apparatus regarding each of a plurality of functions of the image processing apparatus;

recording, by the processor, operation history information indicating a history of operations to the operation device that corresponds to the plurality of setting screens for each of the users regarding each of the plurality of functions, in a nonvolatile storage device;

determining, by the processor, a learning level for each of the plurality of functions for each of the users based on the operation history information; and executing, by the processor, guidance screen control for causing the display device to display a screen that is selected from a plurality of guidance screens according to an operation to the operation device toward the user authenticated by the user authentication processing, the plurality of guidance screens presenting explanatory information on each of the plurality of functions, wherein the processor incorporates information on the learning level for each of the plurality of functions that corresponds to the user authenticated by the user authentication processing into at least one of the plurality of guidance screens.

2. The user interface processing method according to claim 1, comprising:

deriving, by the processor, a number of operations for each of the plurality of functions based on the operation history information; and determining, by the processor, the learning level for each of the plurality of functions according to the number of operations for each of the plurality of functions.

3. The user interface processing method according to claim 2, comprising:

incorporating, by the processor, information on an operation date and time indicating a date and time at which an operation to the operation device has been made into the operation history information;

deriving, by the processor, for each of the plurality of functions, an operation interval which is an interval of a plurality of operation dates and times corresponding to a series of a plurality of operations for setting one processing to be executed by the image processing apparatus based on the operation history information; and correcting, by the processor, the learning level for each of the plurality of functions according to the operation interval for each of the plurality of functions.

4. The user interface processing method according to claim 3, further comprising:

determining, by the processor, an ambiguity level for each of the plurality of functions for each of the users according to the operation interval for each of the plurality of functions; and transmitting, by the processor, when the plurality of functions include a specific function in which a number of the users having the ambiguity level exceeding a reference level, exceeds a reference number, advice information related to the specific function to a destination corresponding to each of the users having the ambiguity level exceeding the reference level via a communication device.

5. The user interface processing method according to claim 2, comprising:

incorporating, by the processor, information on an operation date and time indicating a date and time at which an operation to the operation device has been made into the operation history information;

deriving, by the processor, a zero-operation time for each of the plurality of functions for each of the users based on the information on the operation date and time; and correcting, by the processor, the learning level for each of the plurality of functions according to the zero-operation time for each of the plurality of functions.

6. The user interface processing method according to claim 2, comprising:

when operations corresponding to the plurality of setting screens include a hesitation operation that instructs cancel or return of a setting of the processing to be executed by the image processing apparatus, deriving, by the processor, for each of the plurality of functions, a number of hesitation operations that is a number of the hesitation operations that have been made when performing a series of setting operations for setting one processing to be executed by the image processing apparatus, based on the operation history information; and correcting, by the processor, the learning level for each of the plurality of functions according to the number of hesitation operations for each of the plurality of functions.

7. The user interface processing method according to claim 6, comprising:

determining, by the processor, an ambiguity level for each of the plurality of functions for each of the users according to the number of hesitation operations for each of the plurality of functions for each of the users, and transmitting, by the processor, when a number of the users having the ambiguity level exceeding a reference level, exceeds a reference number regarding a specific function out of the plurality of functions, advice information related to the specific function to a destination corresponding to each of the users having the ambiguity level exceeding the reference level via a communication device.

8. The user interface processing method according to claim 1, comprising:

determining, by the processor, an overall learning level obtained by integrating the learning level for each of the plurality of functions for each of the users; and incorporating, by the processor, information on the overall learning level that corresponds to the user authenticated by the user authentication processing into at least one of the plurality of guidance screens.

9. An image processing apparatus, comprising:

an operation device which accepts an operation;

a display device which displays information;

a processor which realizes the user interface processing method according to claim 1; and an image processing portion which executes image processing set by the operation to the operation device.

* * * * *